April 25, 1961  V. E. SPROUSE  2,981,367
SNAP FILTER FRAME

Filed Oct. 30, 1959  2 Sheets-Sheet 1

INVENTOR
VERNER E. SPROUSE
BY Herbert Q. Minturn
ATTORNEY

April 25, 1961 V. E. SPROUSE 2,981,367
SNAP FILTER FRAME
Filed Oct. 30, 1959 2 Sheets-Sheet 2

INVENTOR
VERNER E. SPROUSE
BY Herbert Q. McIntyre
ATTORNEY

United States Patent Office 2,981,367
Patented Apr. 25, 1961

2,981,367
SNAP FILTER FRAME

Verner E. Sprouse, Columbus, Ind., assignor to Vernco Corporation, Columbus, Ind., a corporation of Indiana Filed Oct. 30, 1959, Ser. No. 849,814
3 Claims. (Cl. 183—44)

This invention is that of a filter frame for removably receiving, and retaining a filter medium suitable for use in filtering gases including atmospheric air. Filter media to be economical in use, should be removable for cleaning purposes and also for replacement purposes from time to time depending upon the accumulation of foreign matter therein and thereon in the actual filtering process. The frame for supporting the filtering medium need not be discarded, but may be used over and over again particularly in the present invention.

A primary object of the invention is to provide a holding frame and a subframe whereby the two frames may be snapped into interengagement to retain the filtering medium in the frame, and likewise where the two frame members may be quickly released simply by pressing the subframe against the filtering medium, and relatively pulling the holding frame laterally from the subframe so that the subframe may be lifted and the filtering medium thus exposed for removal.

A further primary object involved is that of avoidance of having to use interconnecting members which have to be bent or pried apart and then later bent back into holding shape and the like. No tools, such as screwdrivers or wrenches are required to manipulate the filter frame.

These and many other objects and advantages of the invention will become apparent to those versed in the art in the following description of one particular form of the frame as illustrated in the accompanying drawings, in which Fig. 1 is a view in inlet or topside of the filter frame unit;

Figure 2:
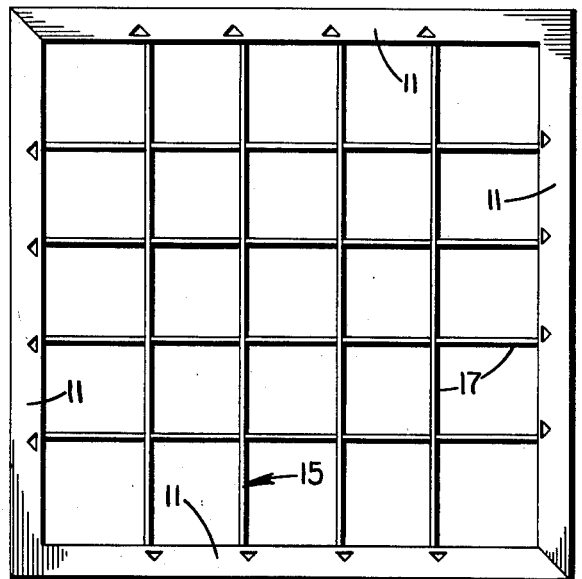
Fig. 2 is a view in plan of the exit or rear side of the filter unit.

A holding frame generally designated by the numeral 10, in the present showing of one particular form of the invention, is formed to be rectangular in shape with an angle bar section wherein there is a foot 11 and a leg 12 extending approximately at right angles therefrom. Depending upon the thickness of metal employed in making the frame, there will be, particularly for lighter thicknesses, a hem 13 overturned from the outer edge of the leg 12. The corners between the bounding lengths of the holding frame may be made in any suitable manner, this particular corner construction being not a part of the present invention per se. The corners will be rigidly constructed.

The foot 11 is provided with a plurality of barbs 14 extending upwardly or forwardly therefrom and directed somewhat diagonally toward the leg 12 in each instance. These barbs 14 are spaced apart one from the other along each of the bounding frame side feet 11.

A supporting grid generally designated by the numeral 15 is provided to rest by marginal edge portions on the forward sides of the feet 11. The grid 15 will be of an open nature, the sizes of the openings depending largely upon the nature of the filtering medium to be employed. Where a filtering medium 16 is largely self supporting, all that the grid 15 need to perform is to prevent the air velocity or pressure passing through the medium from causing the medium to bow in the direction of flow of the air. The medium 16 in the present showing is made out of synthetic rubber or synthetic rubber-like material to have openings or pores through which the air may pass readily without too much friction from one face to the other. The filtering medium 16 will in any event be somewhat elastic in nature so that it may be compressed, and following the compression will return to substantially its normal thickness. The grid 15 as illustrated in Fig. 2 is formed out of a plurality of bars 17 crisscrossing and having the ends of the bars resting on the feet 11, intermediate barbs 14.

Figure 6:
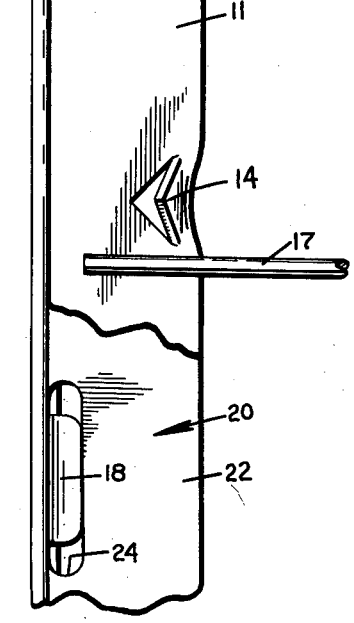
Fig. 6 is a like detail in section showing the filtering medium compressed by a subframe.
Figure 6:
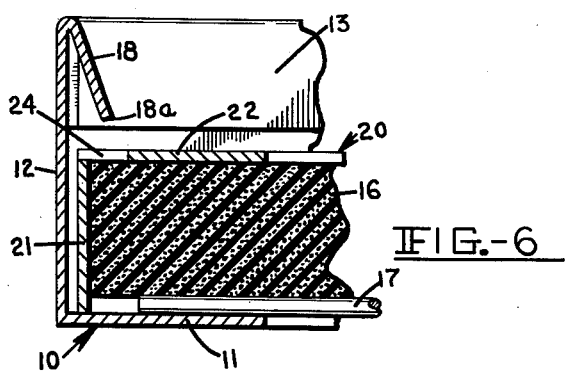

The legs 12, four in number, one on each side of the holding frame carry in each instance a plurality of fingers 18 at any predetermined position along those legs, herein shown as being formed by turning over an edge portion at the upper end of the leg, and where the hem 13 is employed, the finger 18 in each instance will be punched out of that hem, Fig. 6, to extend downwardly and diagonally away from the inner side of the leg 12. In the present showing, there are two of these fingers 18 on each of the side legs 12.

A subframe generally designated by the numeral 20 is rectangular in shape in accordance with the shape of the holding frame 10, and has a rearwardly turned leg 21 entirely therearound from which extends a flange 22 substantially at right angles to the leg 21. The subframe 20 is dimensioned so that it will freely fit by its leg 21 within the legs 12 of the holding frame 10.

The subframe 20 is provided with a plurality of barbs 23 carried by the flange 22. In the form herein shown, these barbs 23 are punched out of the flange 22 to extend rearwardly and diagonally toward but spaced from the leg 21 in each instance. Also in the present form, these barbs 23 are spaced apart along the flanges 22 to be somewhat staggered in relation to the barbs 14 in the legs 11 therebelow.

The subframe is provided with a slot 24 extending through the flange 22 immediately at the juncture of that flange with the leg 21, the slots being arranged in position along those flanges so as to receive the fingers 18 freely therethrough as will be further explained. The marginal portions of two opposite flanges 22 are deformed to provide in effect a boss 25 in each instance extending rearwardly from the two flanges 22.

Operation

The grid 15 is dropped within the holding frame 10 to rest as above indicated by its marginal portions on the feet 11. Over the grid 15 is placed the filtering medium 16, this medium having been previously formed to fit loosely within the holding frame and of such extent that the marginal portions of the medium 16 will lap over the barbs 14 and bear thereagainst.

Figure 5:
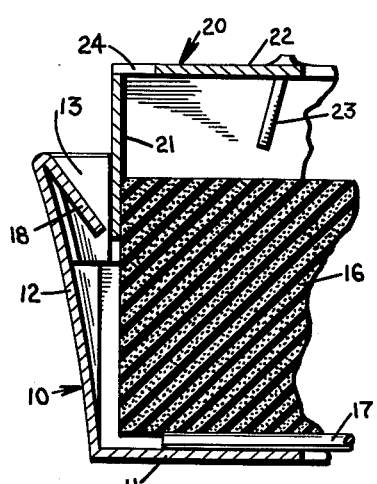
Fig. 5 is a detail in section illustrating an initial positioning of the various parts of the filter unit upon receiving the filter medium.
Figure 4:
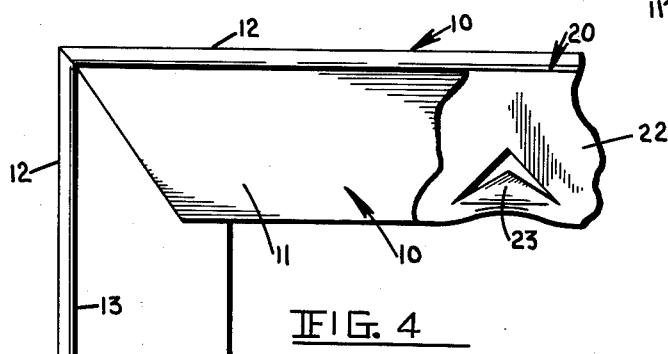
Fig. 4 is a view in detail on an enlarged scale of a corner portion of the filter frame.
Figure 8:
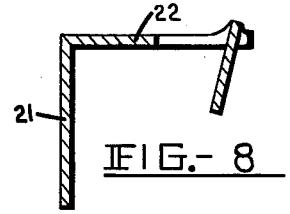
Fig. 8 is a detail in section through the subframe, through a retaining barb.

The subframe 20 is then placed over the filtering medium 16 to have the legs 21 pass rearwardly over the marginal edges of the filtering medium 16. In order to permit the subframe 20 to enter appreciably within the holding frame 10, pressure must be placed upon the subframe to carry the free marginal edges of the legs 21 against the inclined faces of the fingers 18 and thereby push them outwardly to permit the legs 21 to slide on back until the rear sides or faces of the subframe flanges 22 come against the front face of the filtering medium 16, the barbs 23 penetrating the medium 16. This positioning of the various elements is suggested in Figs. 5 and 6. In Fig. 6 however the subframe 20 has been pushed downwardly to compress the medium 16 so as to permit the fingers 18 to spring back and have their lower ends 18a then come over the flanges 22 sufficiently to bring the ends 18a into alignment with the notches 24, whereupon pressure on the subframe 20 may be released, so that the filter medium 16 through its resiliency will carry the subframe 20 upwardly and cause the margin of the slot 24 in each instance to traverse the lower end length of each finger 18 until the forward end of each leg 21 exposed through the slot 24 comes into sliding contact against the rear side of the finger 18 in each instance.

Figure 3:
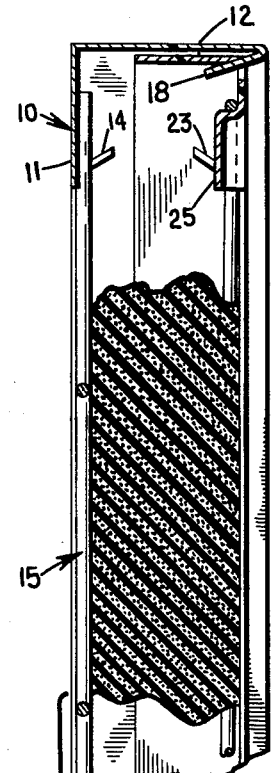
Fig. 3 is a transverse section on an enlarged scale on the line 3—3 in Fig. 1.
Figure 1:
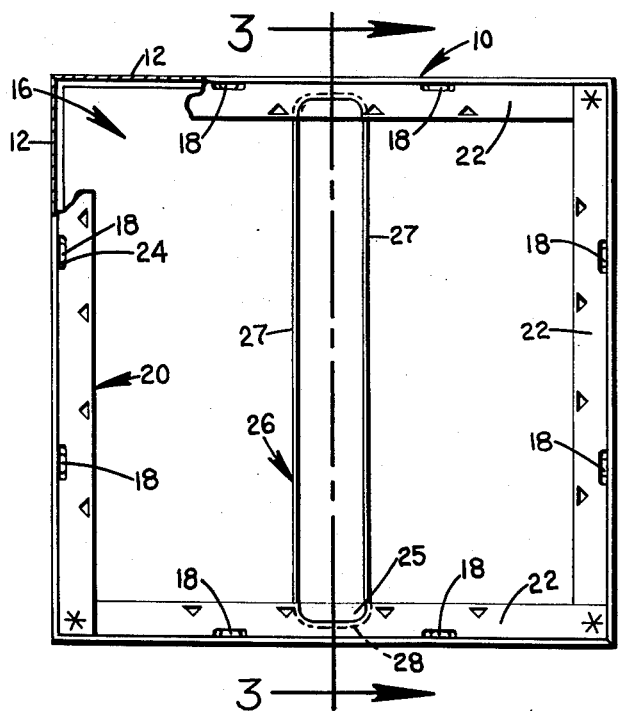
Figure 7:
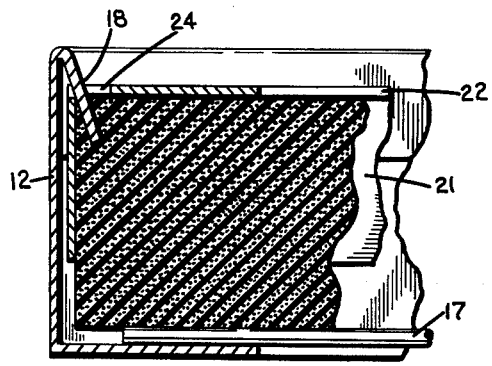
Fig. 7 is a like detail illustrating the filtering medium retained in the normal operating condition through interengagement of the subframe and the holding frame.

The filtering unit is then assembled and is ready for use. The barbs 14 and 23 interengaging the marginal edge portions of the filtering medium 16 tend to keep the medium 16 in its taut condition, uniformly spread across the grid 15. If it is desired to have further restraint of the filtering medium 16, from the or entering side of the filter, a retainer generally designated by the numeral 26 may be provided to extend across at least the central area of the filtering medium 16 and have its opposite ends engaged under opposite flanges 22. In the form of the retainer herein shown, there are a pair of spaced apart wires 27 which have end portions extending under the flanges 22. From those end portions of the wires 27, there extends a length 28 in each instance engaging around the boss 25. This retainer 26 preferably has the wires 27 bowed rearwardly as indicated in Fig. 3 between the flanges 22, so that when the subframe 20 is held in position by the fingers 18, there will be pressure exerted through these wires 27 against the filtering medium and thus retain it against the grid 15. The wires 27 are elastic within the necessary range of bending, and likewise the holding frame legs 12 at least are elastic so that they may be sprung outwardly as above indicated relative to the sides of the subframe.

To remove the filtering medium 16, the upturned legs 12 are pushed laterally as pressure is applied by one's hand rearwardly on the flanges 22 to disengage these fingers from engagement through the slots 24, and while the fingers are thus held laterally away from the subframe, pressure on the subframe is released to perimt the subframe to come forwardly so that it may be entirely free of engagement with the fingers 18, and then removed, followed by removal of the filtering medium 16.

In other words there is a snap action between the holding frame legs 12 and their carried fingers 18 in relation to the flanges 18 of the subframe which are presented toward the legs 12 by edge portions of the planar flanges so that those flanges themselves do not tend to follow the bending of the legs 12 in the releasing action of the fingers 18.

While I have herein described and shown my invention in the one particular form, it is obvious that structural variations may be employed without departing from the spirit of the invention, such for example as having the barbs extend at right angles to the two frame parts and I therefore do not desire to be limited to that precise form beyond the limitations which may be imposed by the following claims.

I claim:

1. The combination with a compressible, resilient filter medium, of a holding frame comprising medium encircling angle members each consisting of a leg defining an area within which said medium may be received, and a foot extending from the leg, upon which foot the medium bears by a marginal portion, a plurality of barbs each spaced apart from the others around said foot and extending therefrom diagonally toward said leg, and a plurality of fingers spaced apart around said leg above said foot directed theretoward and diagonally from the leg; a subframe comprising a leg encircling the periphery of said medium and telescoping within the leg of said holding frame, a flange extending around said subframe leg lapping over a marginal portion of the medium, said flange having a plurality of openings therethrough adjacent the leg of the subframe spaced in accordance with the spacing of said fingers; said subframe being presented to said holding frame with said flange being spaced from said foot by said medium; said medium normally being of a thickness exceeding the height of the subframe leg, and upon pressing the subframe against said medium about its marginal portion within the holding frame, said fingers being pushed from said subframe leg and springing back over said openings when the legs clear the finger ends allowing the fingers to spring back and be received therein upon removal of the pressing force under the resiliency of the medium.

2. The structure of claim 1 in which said holding frame leg has an inturned hem, and said fingers are turned from the hem.

3. The structure of claim 1 in which the leg of the subframe is less in height than that of the leg of the holding frame.

References Cited in the file of this patent

UNITED STATES PATENTS

| | | |
|---|---|---|
| 142,735 | Scherpe | Sept. 9, 1873 |
| 1,001,128 | Elledge | Aug. 22, 1911 |
| 1,761,650 | Beardsley et al. | June 3, 1930 |
| 2,019,867 | Nelson | Nov. 5, 1935 |